United States Patent

Harasaki et al.

[11] 4,270,793
[45] Jun. 2, 1981

[54] AUTOMOBILE FRONT DECK STRUCTURE

[75] Inventors: Hayatsugu Harasaki; Yutaka Imura, both of Hiroshima, Japan

[73] Assignee: Toyo Kogyo Co., Ltd., Hiroshima, Japan

[21] Appl. No.: 81,187

[22] Filed: Oct. 2, 1979

[30] Foreign Application Priority Data

Oct. 2, 1978 [JP] Japan ............................ 53-135800[U]

[51] Int. Cl.³ .............................................. B60K 20/08
[52] U.S. Cl. ....................................... 296/192; 180/90
[58] Field of Search ................... 180/90; 296/192, 193, 296/194

[56] References Cited

U.S. PATENT DOCUMENTS 4,078,840  3/1978  Itoh ...................................... 296/192

Primary Examiner—John J. Love
Assistant Examiner—John A. Carroll
Attorney, Agent, or Firm—Fleit & Jacobson

[57] ABSTRACT

An automobile front deck structure which provides rigid connections among the dash panel, the front pillar and the longitudinally extending wheel apron reinforcement. The front pillar includes an upper pillar structure of closed cross-section and a lower pillar structure of closed cross-section. The longitudinal panel and an outer longitudinal panel forming a closed cross-section, the inner longitudinal panel having a rearward extension extending toward the dash panel and formed at rear end connected to the dash panel, the outer longitudinal panel having a rearward extension extending toward the dash panel and formed at rear end with a laterally outwardly bent flange, an outer lower member of the front pillar having a laterally outwardly bent flange which is connected with the flange on said outer longitudinal panel with the dash panel interposed therebetween, an inner upper member of the front pillar having a laterally bent flange which is connected to the dash panel so that the inner upper member of the front pillar is substantially opposite to the rearward extension of the inner longitudinal panel of the longitudinal reinforcement.

6 Claims, 6 Drawing Figures

AUTOMOBILE FRONT DECK STRUCTURE

The present invention relates to automobile body structures and more particularly to front deck structures of automobile bodies. More specifically, the present invention pertains to corner structures for front decks of automobile bodies.

Front deck structures of automobile bodies have rear side corners wherein front pillar assemblies, dash panel assemblies and longitudinally extending reinforcement members are connected together to provide a rigid body structures. The longitudinal reinforcement member is generally comprised of an inner panel which constitutes a wheel apron and an outer panel welded to the inner panel to provide a box beam structure of a closed cross-section. The front pillar assembly is also of a structure of a closed cross-section which is provided by mutually welded inner and outer members. The dash panel assembly includes a transversely extending panel which is connected at the opposite sides with cowl side panels. At each side of the body, the cowl side panel is connected on one hand with the longitudinal reinforcement member and on the other hand with the front pillar assembly. In this type of structure, since there is a risk that water may leak into the room through the junction between the dash panel and the cowl side panel, it has been proposed to extend the dash panel sidewards to the positions where the front pillar assemblies are located. In such instance, the longitudinal reinforcement member and the front pillar assembly are respectively connected with the adjacent side portion of the dash panel.

However, the conventional structures have not been satisfactory in respect of rigidity and there have been problems in that the dash panel assembly is deformed in crash possible resulting in breakage of front windshield glass. In order to provide an adequately rigid structure, the longitudinal reinforcement member and the front pillar assembly may be connected with the dash panel at substantially the same position so that the longitudinal reinforcement member and the front pillar assembly are essentially connected together with the dash panel interposed therebetween. However, this type of structure has inherent difficulty in performing welding operations.

In Japanese utility model application Sho 51-60373 which has been laid open to public inspection on Nov. 17, 1977 under the utility model disclosure No. Sho 52-151512, there is proposed a front deck corner structure which is intended to solve the welding problem. According to the proposal, the outer member of the front pillar assembly is formed with a cutout so that welding operation can be performed through the cutout. However, this structure is unsatisfactory because a cover must be provided for closing the cutout.

It is therefore an object of the present invention to provide a front deck corner structure for an automobile body in which welding operation can readily be performed and which can provide a satisfactory rigidity.

Another object of the present invention is to provide a front deck corner structure in which the longitudinal reinforcement member is essentially connected with the front pillar assembly.

According to the present invention, the avove and other objects can be accomplished by a front deck structure of an automobile body which comprises a dash panel assembly, a front pillar assembly at each side of the dash panel assembly and a longitudinally extending reinforcement assembly, said front pillar assembly including an inner upper and inner lower members and an outer upper and outer lower members, said inner upper and outer upper members being connected together to provide an upper pillar structure of closed cross-section, said inner lower and outer lower members being connected together to provide a lower pillar structure of closed cross-section, said inner and outer lower members being superposed on the inner and outer upper members and connected therewith, said dash panel assembly including a transversely extending dash panel which has opposite sides adjacent to said front pillar assemblies, said longitudinally extending reinforcement assembly including an inner longitudinal panel and an outer longitudinal panel which together form a reinforcement structure of a closed cross-section, said inner longitudinal panel having a rearward extension extending toward said dash panel and formed at rear end with a laterally bent flange with which said rearward extension is connected to said dash panel, said outer longitudinal panel having a rearward extension extending toward said dash panel and formed at rear end with a laterally outwardly bent flange, said outer lower member of the front pillar assembly having a laterally outwardly bent flange which is connected with said flange on said outer longitudinal panel with said dash panel interposed therebetween, said inner upper member of the front pillar assembly having a laterally bent flange which is connected to the dash panel so that the inner upper member of the front pillar assembly is substantially opposite to the rearward extension of the inner longitudinal panel of the longitudinal reinforcement assembly. The longitudinal reinforcement assembly may be a reinforcement structure for the wheel apron and, in such a case, the inner longitudinal panel may be formed as a part of the wheel apron. Where possible, the inner and outer longitudinal panels may be integral with each other by being connected through an upper longitudinal panel. An additional reinforcement member may be provided to form the closed cross-section.

In a preferable aspect of the present invention, the rearward extension of the inner longitudinal panel of the longitudinal reinforcement assembly is separately formed from the inner longitudinal panel and connected thereto by welding. Further, the rearward extension of the outer longitudinal panel may also be formed separately from the outer longitudinal panel and connected thereto by welding. A corner reinforcement panel such as a cowl panel may be provided to extend between the dash panel and the longitudinal reinforcement assembly so that the connection between the dash panel and the longitudinal reinforcement assembly is strengthened.

The above and other objects and features of the present invention will become apparent from the following descriptions of a preferred embodiment taking reference to the accompanying drawings, in which.

Figure 1:
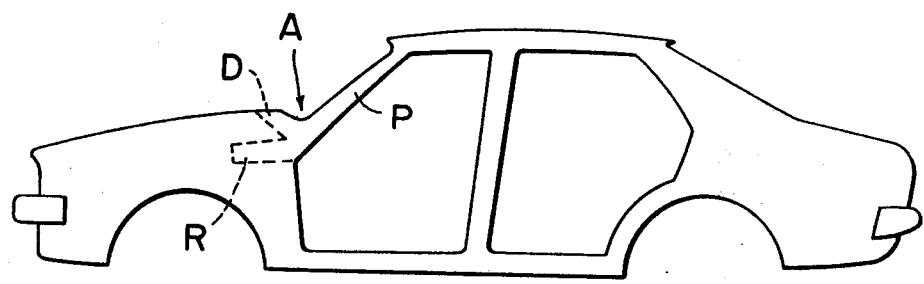
FIG. 1 is a side view of an automobile body to which the present invention can be applied.
Figure 2:
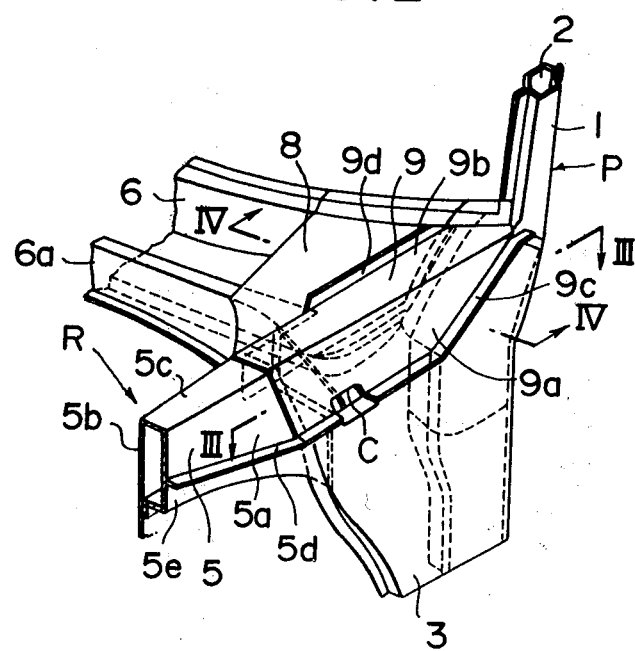
FIG. 2 is a fragmentary perspective view of the front deck corner structure in accordance with one embodiment of the present invention.
Figure 5:
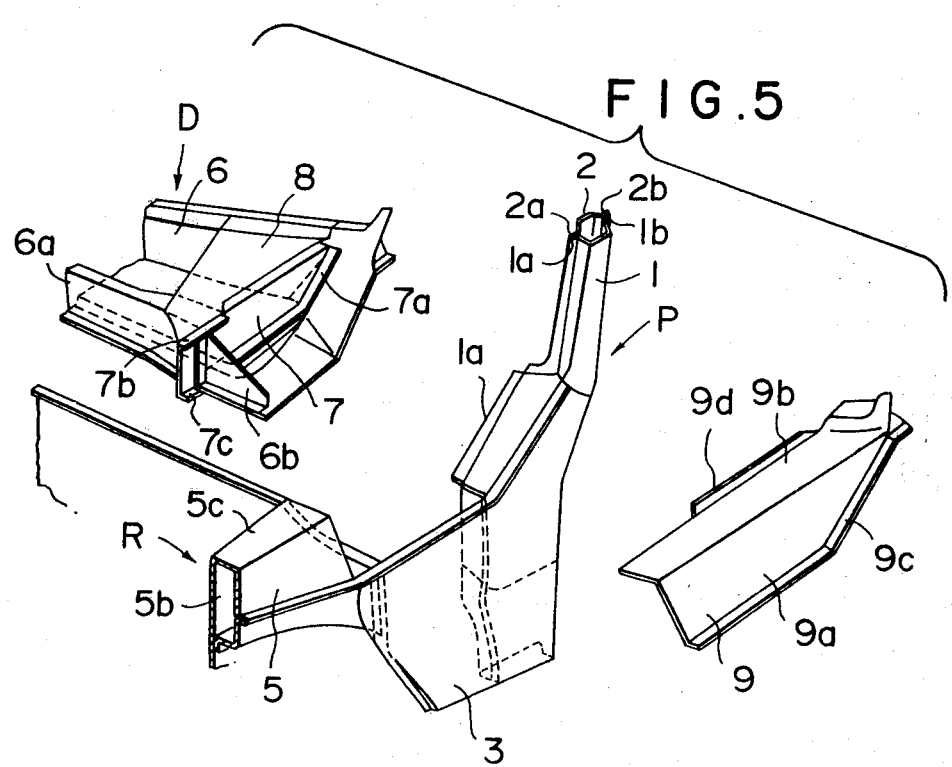
FIG. 5 is an exploded perspective view of the structure shown in FIG. 2.
Figure 6:
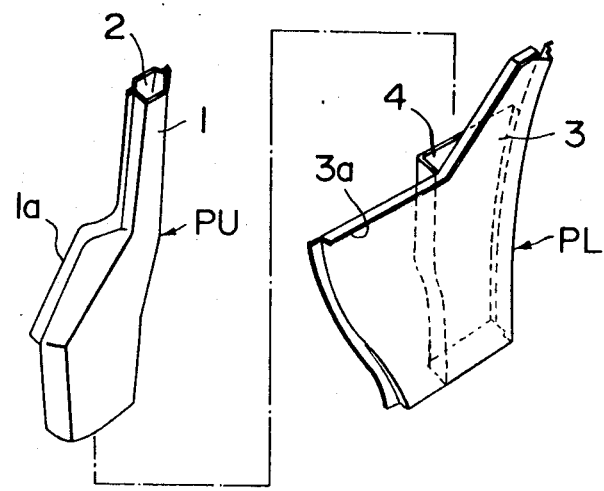
FIG. 6 is an exploded perspective view of the front pillar assembly.

Referring to the drawings, particularly to FIG. 1, there is shown an automobile body having a front deck structure A which comprises a front dash panel assembly D, a front pillar assembly P and a longitudinal reinforcement assembly R. Referring to FIGS. 2 through 6, it will be noted that the dash panel assembly D is of a generally U-shaped cross-sectional configuration having a rear or dash panel 6 and a front panel 6a. As shown in FIGS. 5 and 6, the pillar assembly P is comprised of an upper outer member 1, an upper inner member 2, a lower outer member 3 and a lower member 4. The members 1 and 2 are welded together along their edges such as by spot welding to form a structure of closed cross-section. For the purpose, the members 1 and 2 are respectively formed with flanges 1a, 1b and 2a, 2b along their edges and the flanges 1a and 2a and the flanges 1b and 2b are respectively welded together. The inner lower member 4 is welded to the outer lower member 3 at the inner surface of the member 3. The outer member 3 extends forwardly and upwardly beyond the inner member 4 and is formed at the upper edge portion with an outwardly bent flange 3a having a front horizontal portion and a rear slanted portion. The lower outer member 3 is overlapped with the upper outer member 1 to be welded thereto. Similarly, the lower inner member 3 is overlapped with the upper inner member 2 to be welded thereto.

Figure 3:
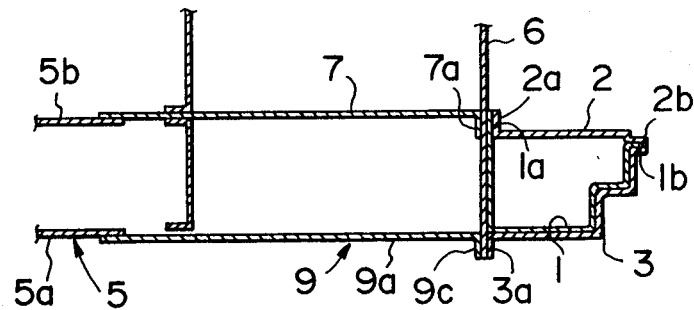
FIG. 3 is a sectional view taken substantially along the line III—III in FIG. 2.
Figure 4:
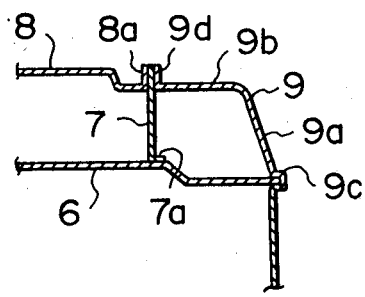
FIG. 4 is a sectional view taken substantially along the line IV—IV in FIG. 2.

The dash panel 6 extends transversely and has a side edge projecting slightly beyond the outer surface of the pillar assembly P. The dash panel 6 is rearwardly inclined at the side portion as shown in FIG. 5 and the front side of the upper outer member 1 has a correspondingly inclined surface so that it can be fitted to the rear side of the dash panel 6. At the inclined portion, the flanges 1a and 2a are bent laterally inwardly so that they lie along the rear side of the dash panel 6 as shown in FIG. 3. The rear slanted portion of the flange 3a on the lower outer member 3 is fitted to the rear side of the dash panel 6 along its side edge.

The longitudinal reinforcement assembly R comprises a panel member 5 of an inverted U-shaped cross-sectional configuration having an outer panel 5a, an inner panel 5b and a top panel 5c. Along the lower edge of the outer panel 5a, there is formed an outwardly bent flange 5d. Connected to the panel member 5 is a lower reinforcement member 5e which is welded along its inner side with the outer surface of the inner panel 5b and along its outer side with the flange 5d so as to form a box structure of closed cross-section. The inner panel 5b is extended downwardly to form a wheel apron.

The panel member 5 of the longitudinal reinforcement assembly has a rear end which terminates in front of the panel 6a of the dash panel assembly D. The lower reinforcement member 5e has a rear end welded to the front edge of the lower outer member 3 of the front pillar assembly P. A cowl side panel 7 is provided so as to extend between the panel 5b and the dash panel 6. As shown in FIGS. 3 and 5, the cowl side panel 7 is formed at its rear end with a laterally outwardly bent flange 7a which is fitted and welded to the front surface of the dash panel 6. It will be noted in FIG. 3 that the flange 7a is opposite to the flanges 1a and 2a with respect to the dash panel 6 so that these flanges 1a, 2a and 7a can be welded together to the dash panel 6.

The cowl side panel 7 extends forwardly beyond the front panel 6a of the dash panel assembly D and is formed at its front portion with an upper and lower flanges 7b and 7c. The cowl side panel 7 is therefore welded at the front portion to the rear end portion of the inner panel 5b to provide a rearward extension of the panel 5b. Where necessary, a reinforcement plate 6b may be provided as shown in FIG. 5 to constitute an extension of the panel 6a for the purpose of increasing the structural rigidity.

A cowl upper panel 8 may be provided so as to extend between the top edges of the panels 6 and 6a. Along the outer edge of the panel 8, there is formed an upwardly bent flange 8a which is fitted to the upper edge portion of the panel 7. At the front portion, the outer edge of the panel 8 extends horizontal and is overlapped with the upper flange 7b of the cowl side panel 7 to be welded thereto such as by spot welding technique.

Between the outer panel 5a of the longitudinal reinforcement assembly R and the dash panel 6, there is provided a junction panel member 9 which is formed as shown in FIG. 5. The junction panel member 9 has an outer panel 9a and a top panel 9b which respectively provide rearward extensions of the outer panel 5a and the top panel 5c of the longitudinal reinforcement assembly R. The outer panel 9a is formed along its lower edge with an outwardly bend flange 9c which is complementary in configuration to the flange 3a of the lower outer member 3 and welded to the flange 3a with the dash panel 6 interposed therebetween. The top panel 9b is formed along its inner edge with an upwardly bent flange 9d which is welded together with the flange 8a of the cowl upper panel 8 to the cowl side panel 7. The front end portion of the junction panel member 9 is laid on the outer edge portion of the cowl panel 8 on the flange 7b of the cowl side panel 7 and the panel member 5 of the longitudinal reinforcement assembly R, and welded thereto.

In assembling, the cowl side panel 7 may at first be put in place by welding the reinforcement plate 6b and the cowl panel 8 may be welded at their front and rear edges to the top edges of the dash panel 6 and the front panel 6a. The front end portion of the cowl side panel 7 can be welded to the panel member 5 without any disturbance. The rear flange 7a of the cowl side panel 7 can be welded together with the flange 1a and 2a of the pillar assembly P to the dash panel 6. When required welding operations are completed, the junction plate 9 is put in place. The lower flange 9c is welded together with the flange 3a of the lower outer member 3 to the dash panel 6. The upper flange 9d is welded together with the flange 8a of the cowl upper panel 8 to the upper edge of the cowl side panel 7. Further the front portion of the panel 9 is welded to the rear portion of the panel member 5 and to the cowl upper panel 8 on the flange 7a of the panel 7.

The cowl side panel 7 provides a rearward extension of the inner panel 5b of the longitudinal reinforcement assembly R and is positioned substantially opposite to the upper inner member 2 with the dash panel 6 interposed therebetween. The outer panel 9a of the junction plate 9 provides a rearward extension of the outer panel 5a and connected with the lower outer pillar member 3. Thus, the box-shaped rigid structure of the longitudinal reinforcement assembly R is connected with the box-shaped rigid structure of the pillar assembly P. Thus, a rigid corner structure can be provided. The cowl upper panel 8 is also effective to provide a further rigidity.

Although the descriptions have been made only with respect to the structure at one side, the same or similar construction is also employed at the other side. Since the dash panel thus extends substantially throughout the width of the body, it is possible to prevent any water leakage into the room.

The invention has thus been shown and described with reference to a specific embodiment, however, it should be noted that the invention is in no way limited to the details of the illustrated structures but changes and modifications may be made without departing from the scope of the appended claims.

We claim:

1. Front deck structure of an automobile body which comprises a dash panel assembly, a front pillar assembly at each side of the dash panel assembly and a longitudinally extending reinforcement assembly, said front pillar assembly including lower and upper pillar structures which are connected together with an overlapped relationship, said front pillar assembly having outer and inner panels respectively providing an outer surface and an inner surface of said front pillar assembly, said dash panel assembly including a dash panel extending transversely and having a side edge adjacent to the outer surface of each front pillar assembly, said longitudinal reinforcement assembly including outer and inner panels which respectively have rearward extensions having rear edges adjacent to the dash panel, said outer panel of the front pillar assembly and said extension of the outer panel of the longitudinal reinforcement assembly being formed with outwardly bent flanges which are welded together with the side edge of the dash panel interposed therebetween, said inner panel of the front pillar assembly and said extension of the inner panel of the longitudinal reinforcement assembly being formed with laterally bent flanges which are welded to the dash panel so that the inner panel of the pillar assembly is substantially opposite to the extension of the inner panel of the longitudinal reinforcement assembly with the dash panel interposed therebetween.

2. Front deck structure in accordance with claim 1 in which said rearward extension of the inner longitudinal panel of the longitudinal reinforcement assembly is separately formed from the inner longitudinal panel and connected thereto by welding.

3. Front deck structure in accordance with claim 2 in which said rearward extension of the outer longitudinal panel is formed separately from the outer longitudinal panel and connected thereto by welding.

4. Front deck structure in accordance with claim 1 in which a corner reinforcement panel is provided to extend between the dash panel and the longitudinal reinforcement assembly so that the connection between the dash panel and the longitudinal reinforement assembly is strengthened.

5. Front deck structure in accordance with claim 1 in which the inner and outer panels of the longitudinal reinforcement assembly are integral with each other by being connected through an upper longitudinal panel and an additional reinforcement member is provided to form a structure of a closed cross-section.

6. Front deck structure of an automobile body which comprises a dash panel assembly, a front pillar assembly at each side of the dash panel assembly and a longitudinally extending reinforcement assembly, said front pillar assembly including inner upper and inner lower members and outer upper and outer lower members, said inner upper and outer upper members being connected together to provide an upper pillar structure of closed cross-section, said inner lower and outer lower members being connected together to provide a lower pillar structure of closed cross-section, said inner and outer lower members being superposed on the inner and outer upper members and connected therewith, said dash panel assembly including a transversely extending dash panel which has opposite sides adjacent to said front pillar assemblies, said longitudinally extending reinforcement assembly including an inner longitudinal panel and an outer longitudinal panel which together form a reinforcement structure of a closed cross-section, said inner longitudinal panel having a rearward extension extending toward said dash panel and formed at rear end with a laterally bent flange with which said rearward extension is connected to said dash panel, said outer longitudinal panel having a rearward extension extending toward said dash panel and formed at rear end with a laterally outwardly bent flange, said outer lower member of the front pillar assembly having a laterally outwardly bent flange which is connected with said flange on said outer longitudinal panel with said dash panel interposed therebetween, said inner upper member of the front pillar assembly having a laterally bent flange which is connected to the dash panel so that the inner upper member of the front pillar assembly is substantially opposite to the rearward extension of the inner longitudinal panel of the longitudinal reinforcement assembly.

* * * * *